United States Patent [19]
Korfer

[11] Patent Number: 6,162,518
[45] Date of Patent: Dec. 19, 2000

[54] TEXTILE LENGTH, PROCESS FOR PRODUCING ONE SUCH TEXTILE LENGTH, AND A DEVICE FOR EXECUTING THIS PROCESS

[75] Inventor: Stefan Korfer, Monchengladbach, Germany

[73] Assignee: Thomas Josef Heimbach Gesellschaft mit beschrankter Haftung & Co., Duren, Germany

[21] Appl. No.: 09/275,813

[22] Filed: Mar. 25, 1999

[30] Foreign Application Priority Data

Apr. 2, 1998 [EP] European Pat. Off. .............. 98106032

[51] Int. Cl.$^7$ ........................................................ B32B 3/08
[52] U.S. Cl. ...................... 428/60; 139/383 AA; 162/904
[58] Field of Search ................ 428/58, 60; 139/383 AA; 162/904

[56] References Cited

U.S. PATENT DOCUMENTS

| | | |
|---|---|---|
| 1,821,455 | 9/1931 | Webb . |
| 3,622,415 | 11/1971 | Kunsman ........................ 139/383 AA |
| 4,090,897 | 5/1978 | Minick . |
| 4,501,782 | 2/1985 | Weatherly et al. . |
| 5,360,656 | 11/1994 | Rexfelt et al. . |
| 5,785,818 | 7/1998 | Fekete et al. .............................. 428/58 |

FOREIGN PATENT DOCUMENTS

| | | |
|---|---|---|
| 0 464 258 | 1/1992 | European Pat. Off. . |
| 0 665 329 | 8/1995 | European Pat. Off. . |
| 52-24488 | 8/1975 | Japan . |
| 51-40209 | 4/1976 | Japan . |
| 57-154447 | 9/1982 | Japan . |
| 61-138765 | 6/1986 | Japan . |
| 62-122896 | 8/1987 | Japan . |
| 975750 | 11/1964 | United Kingdom . |

*Primary Examiner*—Alexander S. Thomas
*Attorney, Agent, or Firm*—Young & Thompson

[57] ABSTRACT

The invention relates to a length of textile, especial as a basis for paper-making machine coverings, the length of textile containing structural threads (8, 9, 10, 11) and viewed width-wise being composed at least in part of several partial lengths (6, 7) which are located next to one another and which are bonded to one another on their edges (12, 13). The invention is characterized in that the partial lengths (6, 7) on their edges (12, 13) have projecting thread sections (14, 15) which fit into one another with overlapping, and that at least one connecting thread (16) is placed over the thread sections (14, 15) and is bonded to the thread sections (14, 15). The invention relates furthermore to a process for producing one such textile length.

12 Claims, 3 Drawing Sheets

TEXTILE LENGTH, PROCESS FOR PRODUCING ONE SUCH TEXTILE LENGTH, AND A DEVICE FOR EXECUTING THIS PROCESS

BACKGROUND OF THE INVENTION

1. Field of the Invention

The invention relates to a length of textile, especially as a basis for paper-making machine coverings, the length of textile containing structural threads and, viewed width-wise, being composed at least in part of several partial lengths which are located next to one another and which are bonded to one another on their edges. It relates furthermore to a process for producing one such textile length.

2. Description of the Related Art

Textile lengths of this type are used first of all for transport of paper webs through a paper-making machine (GB-A-975 750; EP-A-0 665 329; EP-B-0 464 258). Viewed width-wise they are composed of partial lengths, with a width which is much less than the final width of the textile length. The partial lengths extend essentially in the longitudinal direction of the textile length and are formed by one or more partial length strips having been continuously wound in the lengthwise direction of the textile length and helically transversely thereto.

In one version the partial lengths consist of structural threads, for example in the form of a fabric. In other versions the structural threads form a carrier on which a nonwoven is needled on one or both sides so that the textile length forms a felt. These felts are suitable especially for guiding the paper webs in the press part of a paper-making machine.

In the textile lengths known previously the individual partial lengths are wound not only to overlap, but also with their edges next to one another. To obtain sufficient transverse stability, the edges of the lengths are joined to one another. For this reason it is suggested that the edges of the lengths be sewn, melted or bonded, for example with ultrasonic bonding (EP-A-0 665 329). Alternatively it is provided that the edges of the lengths be provided with seam loops and a connection established using an insert wire through the seam loops.

In the known solutions for connecting the edges of the partial lengths, it is disadvantageous that the structure of the textile length in the connection area deviates greatly from the other areas so that for example the permeability of the textile length is changed; this can have an adverse effect for use of the textile length in a paper-making machine on the quality of the paper web. This is especially the case when the edges of the lengths are sewn to one another. The sewing thread represents an outside material which changes the nature of the product. In addition, the displacement strength is unsatisfactory. In addition, some of the proposals for joining the edges of the lengths are very labor intensive.

SUMMARY OF THE INVENTION

Accordingly the object of the invention is to devise a connection for the edges of the partial lengths of a length of textile of the initially mentioned type such that it can be produced simply, preferably by machine, and in doing so can be configured such that the permeability of the length of textile in the connection area is not significantly changed. Another problem consists in making available a process for producing one such connection and a device for executing this process.

This initially mentioned object is achieved by the partial lengths on their edges having projecting thread sections which fit into one another with overlapping, and by at least one connecting thread being placed over the overlapping areas of the thread sections and bonded to the thread sections. The basic idea of the invention is therefore to provide overlapping thread sections on the edges of the lengths adjacent at the time and to place a connecting thread over the sections which then is bonded to the individual thread sections. This yields mutual connection of the two edges of the lengths. The thread sections and the connecting threads can be positioned in such a density that the permeability of the textile length in the area of its edges does not change significantly. The connection of the two edges of the lengths as claimed in the invention can also be done by machine. Thus, production of the connection can be done cost favorably and economically in terms of time.

One version of the invention calls for the connecting threads being bonded to the thread sections on both sides of the textile length. In this way improved strength of the connection can be achieved. In addition, this embodiment is suitable especially for structural threads which are located in two layers on top of one another and in which thread sections projecting from the two layers are formed.

The projecting thread sections can be variously made. Thus it is quite possible to make the thread sections loop-shaped. In one simple embodiment they are made as thread ends which project transversely over the edges of the lengths and which are caused to overlap as they fit into one another when the edges of the lengths are placed next to one another, so that they are located in one plane.

To change the product nature of the length of textile as little as possible it is a good idea for the connecting thread or the connecting threads to be identical to the structural threads which run parallel thereto. In addition, the distance of the connecting thread to the adjacent structural threads which run parallel should be equal to the distance of these structural threads among one another, so that the distribution of longitudinal threads is also constant in the connecting area.

The structural threads are preferably part of a fabric, knit, thread bunch or an insert within a film or the like. In addition, the textile length can be provided at least on one side with a fiber layer in order to impart its felt-like nature.

Basically it is possible to make the textile length finite, and the face edges can be joined by means of a seam. In this case the textile length is composed at least in part of several finite partial strips of a length located next to one another. Alternatively it is provided that the textile length is made continuous, and production can take place as is described in GB-A-975 750; EP-A-0 665 329; EP-B-0 464 258. In this case the partial lengths are formed at least partially from one or more partial strips of the length, each partial strip being wound in the lengthwise direction of the textile length and in a helix transversely thereto. Alternatively the partial strips of a length can also be made continuous themselves and then placed next to one another.

The process as claimed in the invention is characterized in that the partial lengths on their edges are provided with projecting thread sections which are caused to mutually overlap when the partial lengths are placed next to one another and in that a least one connecting thread along the length edges is placed on the overlapping areas of the thread sections and is bonded to the latter, preferably by ultrasound. In doing so the respective connecting thread should be bonded to the thread sections during or immediately after it is placed thereon in order to prevent slipping of the connecting thread.

A device for executing the above described process has a thread feed means for placing at least one connecting thread on the overlapping thread section on the edges of the partial lengths of textile lengths and a bonding means for bonding the connecting thread to the thread sections. This device can be designed basically as a hand device as well. For the quality of the connection it is however more advantageous if there is a special drive for generating relative motion between the thread feed means and the bonding means on the one hand and the textile length on the other so that the respective connecting thread can be placed and bonded essentially by machine.

The device can have a support for example for the stationary receivers of the textile lengths, then the thread feed means and the bonding means being movably guided parallel thereto. Conversely, however it can also be provided that the thread feed means and the bonding means are located stationary and there is a drive for moving the textile length past the two means. One such approach is then possible especially when the textile length is continuous so that it can be clamped between the two rollers.

The bonding means must be able to heat the connecting thread and the projecting thread sections such that they develop adhesive force between the connecting points. An ultrasonic bonding means for example is suited for this purpose.

The thread feed means preferably has a thread magazine from which the connecting thread is automatically withdrawn by the thread feed means.

The invention is detailed in the drawings using a schematic embodiment.

DESCRIPTION OF THE PREFERRED EMBODIMENTS

Figure 1:
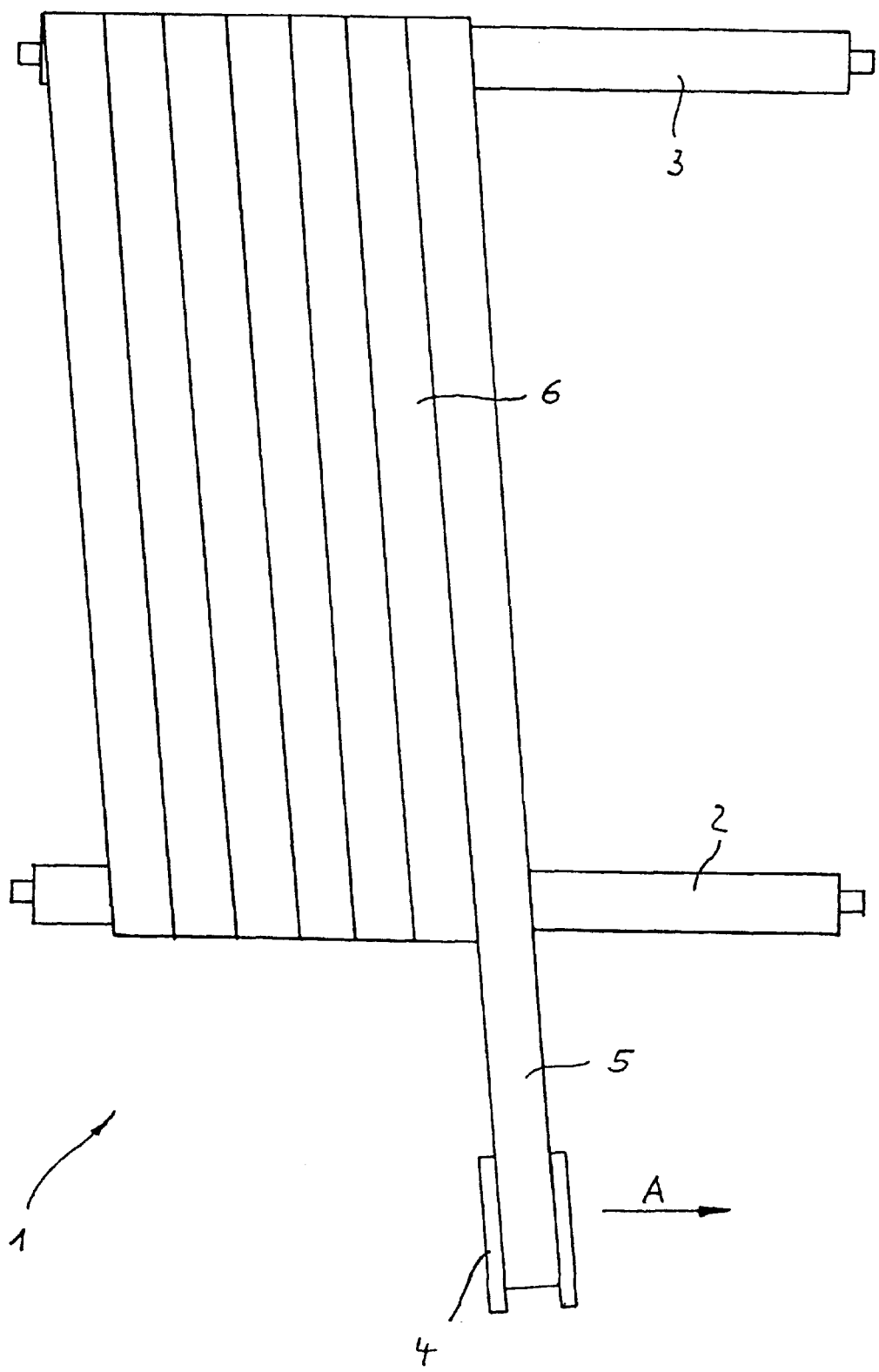
FIG. 1 shows an overhead view of a device for producing a textile length.

The device 1 shown in FIG. 1 has two spaced rollers 2, 3 which are each driven in the same direction. A textile strip 5 is withdrawn from a supply roll 4. The supply roll 4 is slightly inclined and is moved during withdrawal in the direction of the arrow A. In this way the textile strip 5 is wound helically onto the two rollers 2, 3 until a desired width is achieved. This can take place in several layers by the supply roll 4 being moved back again after the final width is reached, the run-off angle being matched accordingly. In particular this can be taken from EP-A-0 665 329 and EP-B-0 464 258. Depending on the ratio of the withdrawal speed and the speed of transverse motion of the supply roll 4, the individual partial lengths, for example labelled 6, overlap, or their edges come to rest next to one another. The two can also be combined with one another, as the different embodiments disclosed in EP-B-0 464 258 show.

Figure 2:
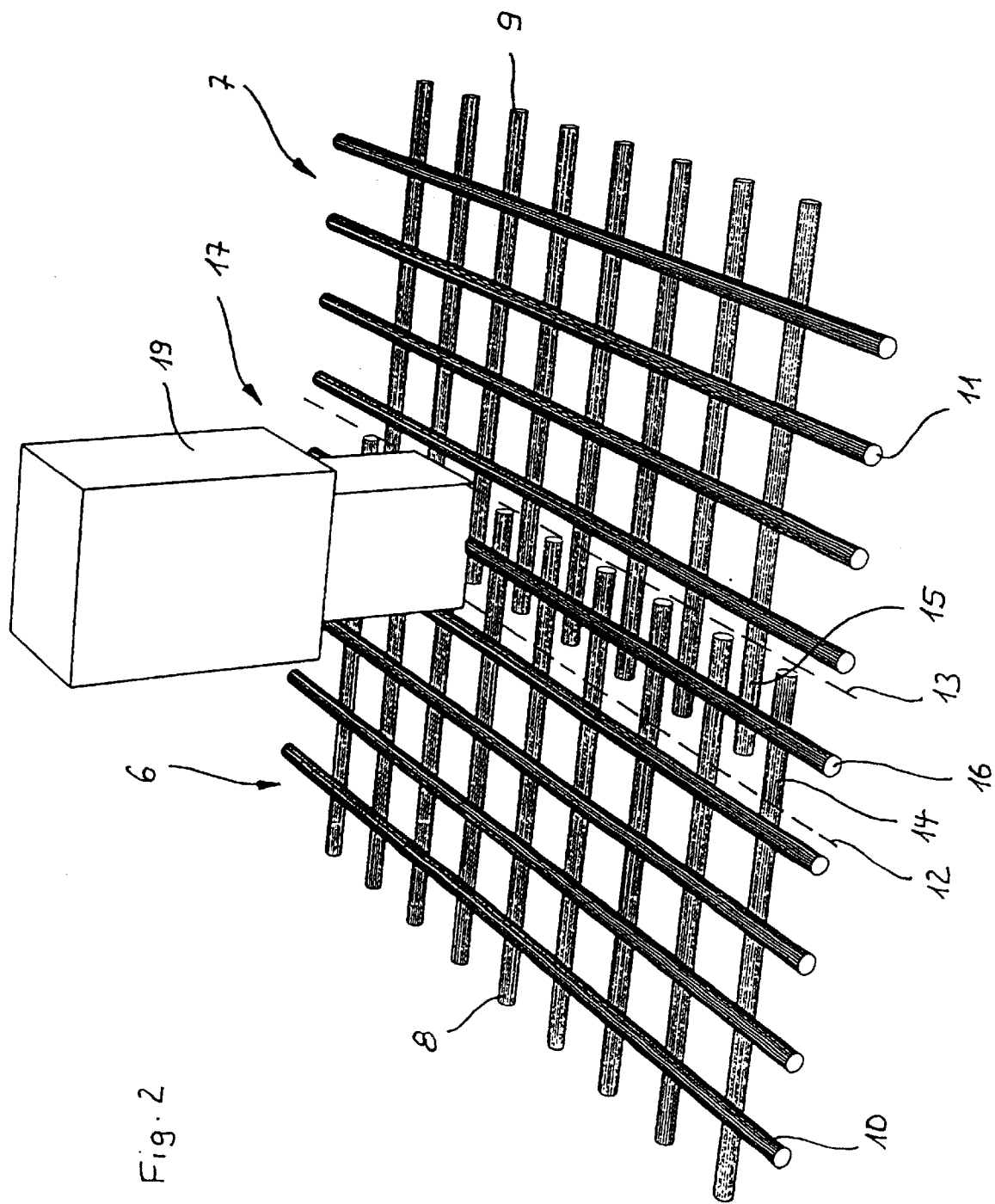
FIG. 2 shows a perspective view of the structural threads of two partial lengths in the area of their edges with an ultrasonic bonding means and FIG. 3 shows a side view of the arrangement as shown in FIG. 2.
Figure 3:
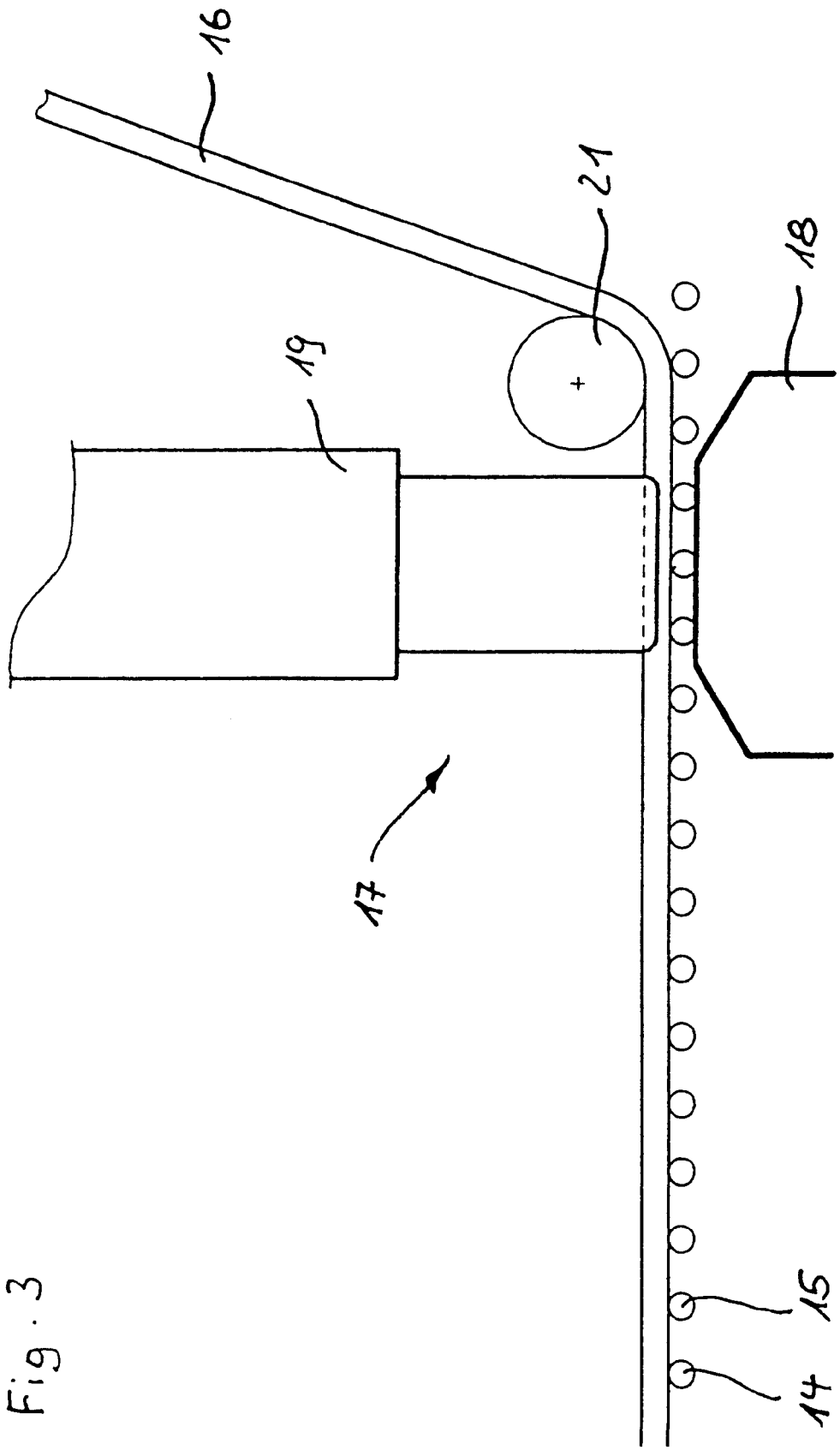

FIG. 2 shows in an enlarged representation a cutout of two adjacent partial lengths 6, 7 which have been placed next to one another from the textile strip 5 by withdrawal from the supply roll 4. The partial lengths 6, 7 each consist of transverse threads, for example labelled 8 or 9, which taken together form a transverse thread bunch. In addition, the longitudinal threads, for example labelled 10 or 11, which taken together form a longitudinal thread bunch, are placed at uniform intervals. The transverse threads 8, 9 and longitudinal threads 10, 11 are joined to one another at their intersection point, for example by bonding, cementing or the like. They consist of thermoplastics as are used for papermaking machine belts, for example polyamide, polyester, etc. They can be made as monofilaments or multifilaments.

The partial lengths 6, 7 have edges 12, 13 which are identified by the broken lines. The transverse threads 8, 9 project above the edges 12, 13 of the length and there they form thread sections, labelled for example 14 and 15, one thread section 14 and 15 of one partial length 6, 7 fitting into a gap between two thread sections 14 and 15 of the other partial length 6 and 7 so that the thread sections 14, 15 overlap when viewed in the direction of the longitudinal threads 10, 11. The partial lengths 6, 7 are therefore offset against one another by one half of the center distance between two adjacent transverse threads 8 and 9 so that the fit into one another like a zipper.

Parallel to the longitudinal threads 10, 11 a connecting thread 16 is placed over the thread sections 14, 15 and is bonded to the latter sections 14, 15. To do this the device 1 at a suitable location has a connecting means 17 between the two rollers 2, 3. The connecting means 17 has a bottom support beam 18 which extends parallel to the rollers 2, 3 and which supports the partial lengths 6, 7. Above the support beam 18 there is a conventional ultrasonic bonding means 19 through which the connecting thread 16 runs. By mean of the ultrasonic bonding means 19 it is heated so strongly that it is partially plasticized and it adheres to the thread sections 14, 15.

In front of the ultrasonic bonding means 19 there is a thread feed means 20 with a feed roll 21 and a thread magazine which is not detailed for the connecting thread 16. From this thread magazine the connecting thread 16 is pressed via the feed roll 21 onto the thread sections 14, 15 and then by plasticization in the ultrasonic bonding means 19 is joined to the thread sections 14, 15. In this way a strong connection between the two partial lengths 6, 7 is formed.

It is not critical that the overlapping of the thread sections 14, 15 be produced as is apparent from FIG. 2. It is also conceivable that only every other transverse thread 8, 9 forms projecting thread sections 14, 15 and the partial lengths 6, 7 are offset by one half center distance between the two thread sections 14, 15. In this way the density of the thread sections 14, 15 is reduced to the density of the transverse threads 8, 9.

Another possibility is not to offset the partial lengths 6, 7 against one another and alternatingly to provide only every other transverse thread 8, 9 with a projecting thread section so that the faces of the transverse threads 8, 9 are opposite one another at a short distance. In this case the density of the thread sections 14, 15 would correspond to the density of the transverse threads 8, 9.

As is apparent from FIG. 2 the distance of the edges 12, 13 of a length is selected such that the connecting thread 16 to the adjacent longitudinal thread 10, 11 has the same distance to the adjacent longitudinal threads as the longitudinal threads 10, 11 have among one another. The thread density of the longitudinal threads 10, 11 is therefore constant after attaching the connecting thread 16 also in the area of the edges 12, 13 of the length.

After completing the connection in the above described manner the partial lengths 6, 7 are occupied with a nonwoven and are needled to the thread bunch. The nonwoven can also be applied in a strip in a similar manner as is shown in FIG. 1 with the textile strips 5.

What is claimed is:

1. Length of textile, used for paper-making machine coverings, the length of textile containing structural threads (8, 9, 10, 11) and viewed width-wise being composed at least in part of several partial lengths (6, 7) which are located next to one another and which are bonded to one another on their edges (12, 13), characterized in that the partial lengths (6, 7) on their edges (12, 13) have projecting thread sections (14, 15) which fit into one another, and that at least one connecting thread (16) is placed over the thread sections (14, 15) and is bonded to the thread sections (14, 15), wherein a continuous length of said at least one connecting thread (16) overlies multiple successive interfitting sections (14, 15) from each of a pair of adjacent partial lengths (6, 7) on a same side of said partial lengths (6, 7).

2. Textile length as claimed in claim 1, wherein plural connecting threads are bonded to the thread sections on both sides of the partial lengths.

3. Textile length as claimed in claim 1, wherein the thread sections (14, 15) are made as thread ends which project transversely over the edges (12, 13) of the lengths.

4. Textile length as claimed in claim 1, wherein the thread sections (14, 15) and the connecting thread (16) are present in such a density that the permeability of the textile length is uniform.

5. Textile length as claimed in claim 1, wherein the connecting thread (16) or the connecting threads is or are identical to the structural threads (10, 11) which run parallel thereto.

6. Textile length as claimed in claim 1, wherein the distance of the connecting thread (16) to the adjacent structural threads (10, 11) which run parallel is equal to the distance of these structural threads (10, 11) among one another.

7. Textile length as claimed in claim 1, wherein the structural threads (8, 9, 10, 11) are part of a fabric, knit, thread bunch or an insert.

8. Textile length as claimed in claim 1, wherein the textile length has one fiber layer at least on one side.

9. Textile length as claimed in claim 1, wherein the textile length is made continuous.

10. Textile length as claimed in claim 1, wherein the partial lengths are made from several textile length strips of the same length.

11. Textile length as claimed in claim 1, wherein the partial lengths (6, 7) are formed at least partially by a partial length strip (5) which is continuously wound in the lengthwise direction of the textile length and helically transversely thereto.

12. Textile length as claimed in claim 1, wherein the partial length strips are made continuous.

\* \* \* \* \*